United States Patent [19]

Sawatani

[11] Patent Number: 4,905,501
[45] Date of Patent: Mar. 6, 1990

[54] JIG FOR LEAK CHECK

[75] Inventor: Teruo Sawatani, Shizuoka, Japan

[73] Assignee: Kabushiki Kaisha Nippon Automation, Japan

[21] Appl. No.: 289,234

[22] Filed: Dec. 22, 1988

[30] Foreign Application Priority Data

Dec. 24, 1987 [JP] Japan .................................. 62-325466
Sep. 19, 1988 [JP] Japan .................................. 63-232283

[51] Int. Cl.$^4$ .............................................. G01M 3/04
[52] U.S. Cl. .......................................... 73/40; 73/49.2
[58] Field of Search .................... 73/40, 40.7, 49.2, 37

[56] References Cited

U.S. PATENT DOCUMENTS

| | | | |
|---|---|---|---|
| 3,027,753 | 4/1962 | Harder, Jr. et al. | 73/40.7 |
| 3,813,923 | 6/1974 | Pendleton | 73/49.2 |
| 4,012,945 | 3/1977 | Bergstrand | 73/49.2 |
| 4,055,984 | 11/1977 | Marx | 73/49.2 |
| 4,584,877 | 4/1986 | Brayman | 73/40.7 |
| 4,672,366 | 6/1987 | Butts | 73/49.2 |
| 4,791,805 | 12/1988 | Gates | 73/49.2 |

FOREIGN PATENT DOCUMENTS

| | | | |
|---|---|---|---|
| 112027 | 5/1987 | Japan | 73/49.2 |
| 795538 | 1/1981 | U.S.S.R. | 73/49.2 |

Primary Examiner—Hezron E. Williams
Attorney, Agent, or Firm—Steinberg & Raskin

[57] ABSTRACT

A jig for leak check capable of safely carrying out leak check of a hollow checked object using pressurized gas without damaging it irrespective of its wall thickness. The jig includes a jig body constituted by two joinable members so as to define an inner space therein. In the jig body is provided a closed chamber in which a checked object is hermetically received for leak check. The closed chamber may be formed by the inner space of the jib member itself. Alternatively, it may be formed by cooperation between a depression of a flexible and stretchable air bag arranged in the inner space of the jig body and a part of an inner surface of the jig body. The closed chamber is provided on at least a part of its surface with a leak lead-out element which may comprise a plurality of fine grooves formed in a mesh-like pattern on the surface of the closed chamber or a lining made of an air-permeable material and applied on the inner surface of the closed chamber.

5 Claims, 4 Drawing Sheets

JIG FOR LEAK CHECK

BACKGROUND OF THE INVENTION

1. Field of the Invention

This invention relates to a jig for leak check, and more particularly to a leak check jig which is adapted to permit pressurized gas for leak check to be supplied to a hollow object to be checked without damaging the object.

2. Description of the Prior Art

Conventionally, leak check of a sealed hollow object to be checked (hereinafter referred to as "checked object") such as a gasoline tank for an automobile, a heat exchange panel for a solar hot well or the like is carried out in a manner to supply the hollow checked object with pressurized gas and detect leak of gas from any defect of the checked object such as pinholes, poor weld or the like by means of a leak detector such as a flowmeter, a pressure gauge, a bubble detector or the like. Alternatively, it may be carried out by immersing the checked object in a water tank for visual detection.

Unfortunately, the conventional leak check fails to properly supply gas of a high pressure to a thin-walled hollow vessel or checked object such as a gasoline tank for an automobile or a heat exchanger panel for a solar hot well without adversely affecting it, resulting in a failure in accurate and rapid leak check. More particularly, in the conventional leak check, supply of pressurized gas to a hollow checked object causes it to be deformed due to expansion to lead to troubles such as damage of a welded portion of the vessel and the like.

Also, the conventional leak check utilizing immersion of the checked object in water requires to dry it after leak check, resulting in any extra facilities, labor and time being needed.

Accordingly, it would be highly desirable to develop leak check techniques which are capable of supplying gas of a high pressure to a hollow vessel or checked object without damaging it and carrying out accurate and rapid leak check of the checked object with a simple manner.

SUMMARY OF THE INVENTION

The present invention has been made in view of the foregoing disadvantages of the prior art.

Accordingly, it is an object of the present invention to provide a jig for leak check which is capable of safely carrying out leak check of a hollow checked object using pressurized gas without damaging it irrespective of its wall thickness.

It is another object of the present invention to provide a jig for leak check which is capable of accurately and rapidly accomplishing leak check of a hollow checked object in spite of using pressurized gas.

It is a further object of the present invention to provide a jig for leak check which is capable of permitting pressurized gas to be used for leak check of a hollow checked object without adversely affecting it.

It is still another object of the present invention to provide a jig for leak check which is capable of carrying out leak check of a hollow checked object while substantially reducing facilities, costs, time and labor required for the check.

It is yet another object of the present invention to provide a jig for leak check which is capable of being applied to any checked object irrespective of its configuration.

In accordance with the present invention, a jig for leak check is provided. The jig includes a jig body constituted by at least two joinable members joined together so that an inner surface of the jig body defines an inner space in the jig body. The jig body is provided therein with a closed chamber for receiving a hollow checked object therein. The closed chamber is so formed that it may have a surface of which at least a part is intimately contacted with an outer surface of the hollow checked body. The jig also includes pressurized gas supply means provided through a wall of the jig body so as to hermetically communicate with the hollow checked object. The above-described closed chamber is provided on at least a part of its surface with leak lead-out means. The jig further includes leak transfer means provided through the wall of the jig body so as to cause the leak lead-out means to communicate therethrough with an exterior of the jig body.

In a preferred embodiment of the present invention, the closed chamber is defined by the inner space of the jig body. The leak lead-out means may comprise a plurality of fine grooves formed in a mesh-like pattern on the inner surface of he jig body and the leak transfer means may be arranged in a manner to communicate with at least one of said grooves. Such construction causes the inner surface of the jig body to be divided into a number of segments which are intimately contacted with the outer surface of the hollow checked object. Alternatively, the leak lead-out means may comprise a lining made of an air-permeable material and applied on the inner surface of the jig body.

Alternatively, the closed chamber may be formed in the inner space of the jig body. An air bag made of a flexible and stretchable material is received in the inner space of the jig body. The air bag is formed with a depression which cooperates with a part of the inner surface of the jig body to form the closed chamber in the inner space of the jig body . Such construction permits the outer surface of the hollow checked object to be intimately contacted with a surface of the depression irrespective of an outer configuration of the object. In this instance, the joinable members may comprise a box-like main member and a lid-like member and the air bag may be so arranged that the depression is opened toward the lid-like member, resulting in the above-described part of the inner surface of the jig body being constituted by an inner surface of the lid-like member. The leak lead-out means likewise may comprise a plurality of fine grooves formed in a mesh-like pattern on the surface of the depression of the air bag or a lining made of an air-permeable material and applied on the surface of the depression.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENTS

Now, a jig for leak check according to the present invention will be described hereinafter with reference to the accompanying drawings.

Figure 1:
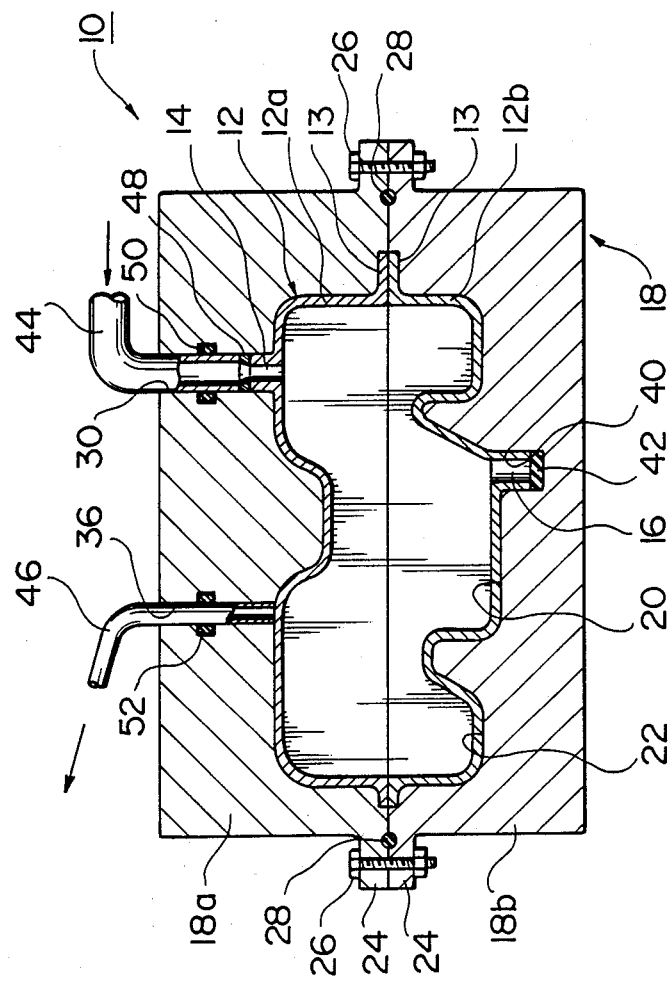
FIG. 1 is a vertical sectional view showing an embodiment of a jig for leak check according to the present invention.
Figure 2:
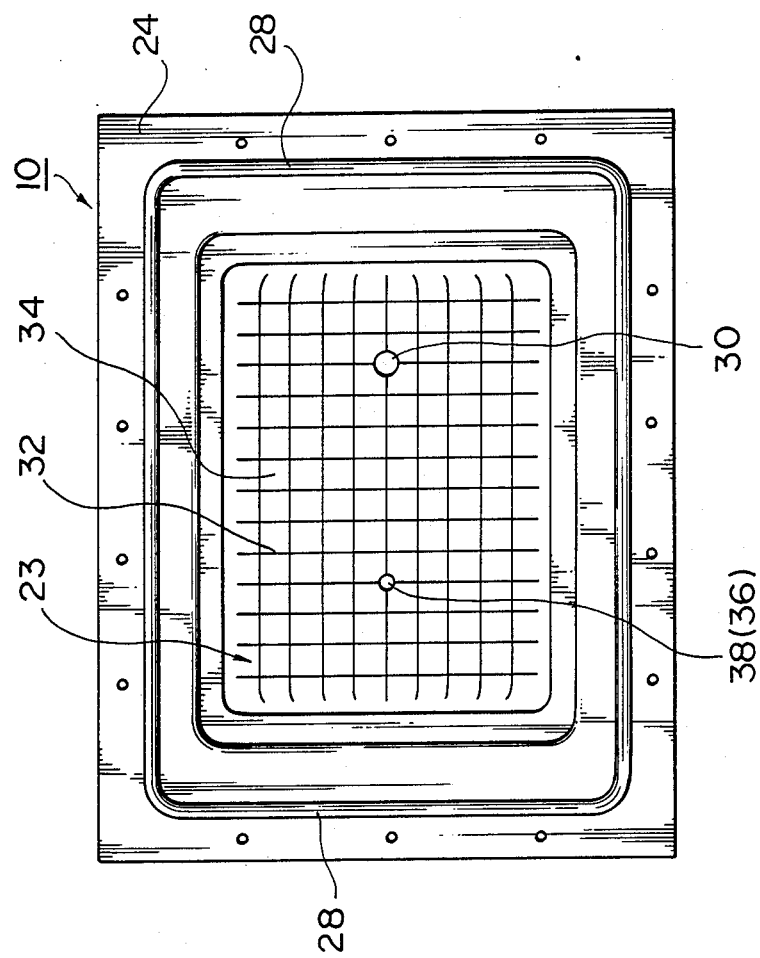
FIG. 2 is a plan view showing an inner surface of one of casing members constituting a jig body of the jig shown in FIG. 1.

FIGS. 1 and 2 shows an embodiment of a jig for leak check according to the present invention.

A jig of the embodiment generally designated by reference numeral 10 in FIGS. 1 and 2 is constructed so as to carry out leak check of a hollow gasoline tank for an automobile which is a checked object designated at reference numeral 12. The hollow gasoline tank 12 is constituted by two halves 12a and 12b joined together by welding flanges 13 formed at their peripheries to each other. In the illustrated embodiment, the gasoline tank 12 is constituted by an upper half 12a and a lower half 12b. The gasoline tank 12 is provided at upper and lower portions thereof with a gasoline inlet port 14 and a gasoline outlet port 16, respectively. Also, the gasoline tank 12 is formed on an outer surface thereof with irregularities.

The jig 10 of the illustrated embodiment includes a jig body 18 rigidly constituted by at least two joinable halves or casing members joined together. In the illustrated embodiment, jig body 18 is constituted by two casing members or an upper half or casing member 18a and a lower half or casing member 18b respectively corresponding to the upper and lower halves 12a and 12b of the gasoline tank 12. The so-constituted jig body 18 has an inner space 20 defined therein by an inner surface of the body 18.

The jig 10 also includes a closed chamber 22 provided in the jig body 18 for receiving the checked object or gasoline tank 12 therein for leak check. The closed chamber 22 is so formed that it may take substantially the same shape as an outer configuration of the gasoline tank 12. In the illustrated embodiment, the closed chamber 22 is defined by the inner space 20 of the jig body 18 itself. For this purpose, the upper and lower halves or casing members 18a and 18b of the jig body 18 are formed into shapes which permit the upper and lower halves 12a and 12b of the gasoline tank 12 to be respectively fittedly received in the casing members 18a and 18b and an outer surface of the tank 12 to be substantially contacted with a surface 23 of the closed chamber 22 and therefore the inner surface of the jig body 18.

Thus, in the illustrated embodiment, the two joinable casing members 18a and 18b of the jig body 18 are formed corresponding to the two halves 12a and 12b of the checked body 12. The casing members 18a and 18b are connected together through flanges 24 formed at the members corresponding to the joined portions or flanges 13 of the halves 12a and 12b of the checked object 12. The flanges 24 are securely joined together by means of fasteners 26 such as bolts and nuts with a sealing member 28 such as an O-ring being interposed therebetween.

The jig 10 also includes pressurized gas supply means 30 provided through a wall of the jig body 18 so as to hermetically or airtightly communicate with the checked object 12. In the illustrated embodiment, the pressurized gas supply means 30 comprises a pressurized gas supply port formed through the wall of the jig body 18 so as to be hermetically connected to the gasoline inlet port 14 of the gasoline tank 12.

Further, the jig 10 of the illustrated embodiment includes leak lead-out means 32 provided on at least a part of the surface 23 of the closed chamber 22 for leading out any possible leak from the checked object 12. In addition, the jig 10 includes leak transfer means 36 provided through the wall of the jig body 18 for transferring leak led out at the leak lead-out means 32 therethrough to an exterior of the jig body 18 for detection of the leak by means of suitable leak detecting means.

In the illustrated embodiment, the leak lead-out means 32 comprises a plurality of fine grooves formed on the surface 23 of the closed chamber 22 in a mesh-like manner or so as to extend substantially perpendicular to one another, so that the inner surface 23 may be divided into a number of segments 34. The segments 34 each may be formed into a substantially rectangular or square shape. The grooves 32 serve as passages for guiding leak or leak gas to the leak transfer means, during which the segments 34 are kept substantially intimately contacted with the outer surface of the checked object.

The leak transfer means 36 comprises a leak gas discharge passage formed through the wall of the jig body 18 so that its inner end may be opened at the surface 23 of the closed chamber 22. In the illustrated embodiment, the inner end of the passage 36 is arranged at a position communicated with any one of the fine grooves. The inner end 38 is preferably positioned at any intersection between the fine grooves 32, as shown in FIG. 2.

The lower casing member 18b is formed with a hole 40 for fittedly receiving the outlet port 16 of the gasoline tank 12 therein, in which a sealing member 42 is arranged so as to close a tip end of the outlet port 16.

Now, the manner of operation of the jig of the illustrated embodiment constructed as described above will be described hereinafter with reference to FIGS. 1 an 2.

First, the upper and lower casing members 18a and 18b are fitted on the checked object or gasoline tank 12 and joined together through the flanges 24 by means of the fasteners 26 to form the jig body 18 and sealedly receive the checked object therein. In such assembling of the jig 10, the sealing member 42 is placed in the hole 40 of the lower casing member 18b and the outlet port 16 of the gasoline tank 12 is abutted against the sealing member 42 for closing the outlet port 16. However, such closing of the outlet port 16 may be carried out using a stopper.

Then, to the pressurized gas supply port 30 is connected a pressurized gas supply tube 44 extending from a pressurized gas source (not shown) for supplying gas of a high pressure, whereas the leak gas discharge passage 36' is connected thereto an exhaust tube 46 extending from a suitable leak detecting device (not shown) for detecting leak from the checked object 12 such as a flowmeter, a pressure gauge, a bubble detector or the like. For the purpose of sealed connection of the tube 44 to the jig body 18, a sealing member 48 is interposed between an end surface of the inlet port 14 of the gasoline tank 12 and an end surface of the pressurized gas supply tube 44 and a sealing member 50 is interposed between an outer periphery of the supply tube 44 and an inner periphery of the pressurized gas supply port 30 of the jig body 18. Likewise, between an outer periphery of the leak gas exhaust tube 46 and an inner periphery of the leak gas discharge passage 36 of the jig body 18 is interposedly arranged a sealing member 52.

After the gasoline tank 12 is thus sealedly received in the jig body 18, gas of a high pressure such as pressurized air is supplied under a pressure of, for example, 10kg/cm$^2$ from the pressurized gas source through the supply tube 44 and inlet port 14 to the gasoline tank 12. Accordingly, leak or leak gas from the gasoline tank 12 occurring when the gasoline tank has any defect causing leak such as poor weld or pin holes is guided to at least any one of the fine grooves 32 and then the leak gas discharge passage 36.

In this instance, for example, a flowmeter or the like is used as the leak detecting means, leak gas from the gasoline tank 12 is led out through the grooves 32 and leak gas discharge passage 36 to the leak gas exhaust tube 46 and then the leak detecting means, resulting in leak from the tank 12 being detected by leak gas itself. Whereas, when a pressure gauge or the like is used as the leak detecting means, a variation or increase in pressure in the closed chamber 22 which is caused due to leak from the tank 12 is transmitted through the fine grooves 32, leak gas discharge passage 36 and leak gas exhaust tube 46 to the detecting means, so that the leak from the checked object may be detected utilizing a variation in pressure in the closed chamber 22.

In the jig of the illustrated embodiment constructed as described above, the fine grooves 32 formed on the surface 23 of the closed chamber 22 and the mesh-like segments 38 permit lead out of leak gas from the checked object to the leak detecting means while keeping the checked body 12 contacted with the surface 23 of the closed space 22 and therefore the inner surface of the jig body 18. Accordingly, the present invention effectively prevents expansion or deformation and damage of the checked object 12 irrespective of supply of pressurized gas to the checked object and ensures accurate and rapid leak check. Also, the illustrated embodiment eliminates a necessity of immersing the checked object in liquid such as water, so that drying of the checked object after leak check may be eliminated, resulting in reduction of facilities, costs, time and labor needed for leak check.

In the embodiment described above, the leak lead-out means comprises the fine grooves 32 formed in a mesh-like manner on the surface 23 of the closed chamber 22. However, the leak lead-out means is not limited to such fine grooves. It may comprise an air-permeable lining applied on the surface 23 of the closed chamber 22. For this purpose, a lining made of a porous material such as porous ceramics, porous castings, porous aluminum, a wire mesh or the like may be used.

Such a lining may function as the leak lead-out means 32 like the above-described fine grooves, as well as is intimately contacted with the outer surface of the gasoline tank 12 to cause it to be held in the closed chamber 22 without any expansion and deformation.

The lining may be fixedly or detachably arranged on the inner surface of the jig body 18.

Figure 3:
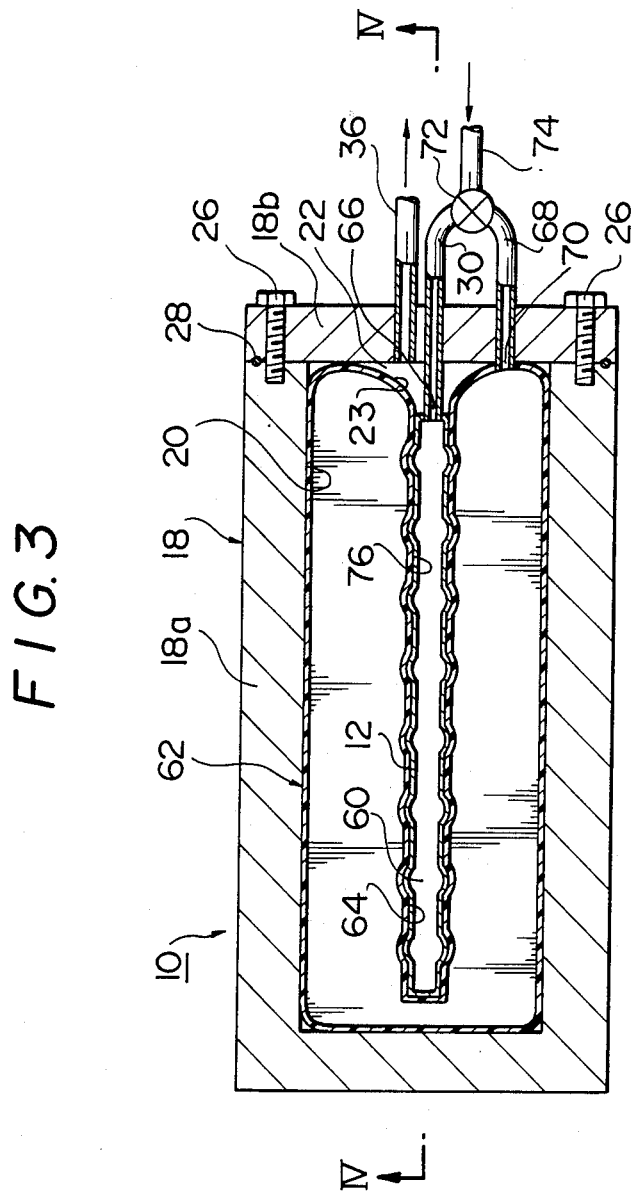
FIG. 3 is a vertical sectional view showing another embodiment of a jig for leak check according to the present invention.
Figure 4:
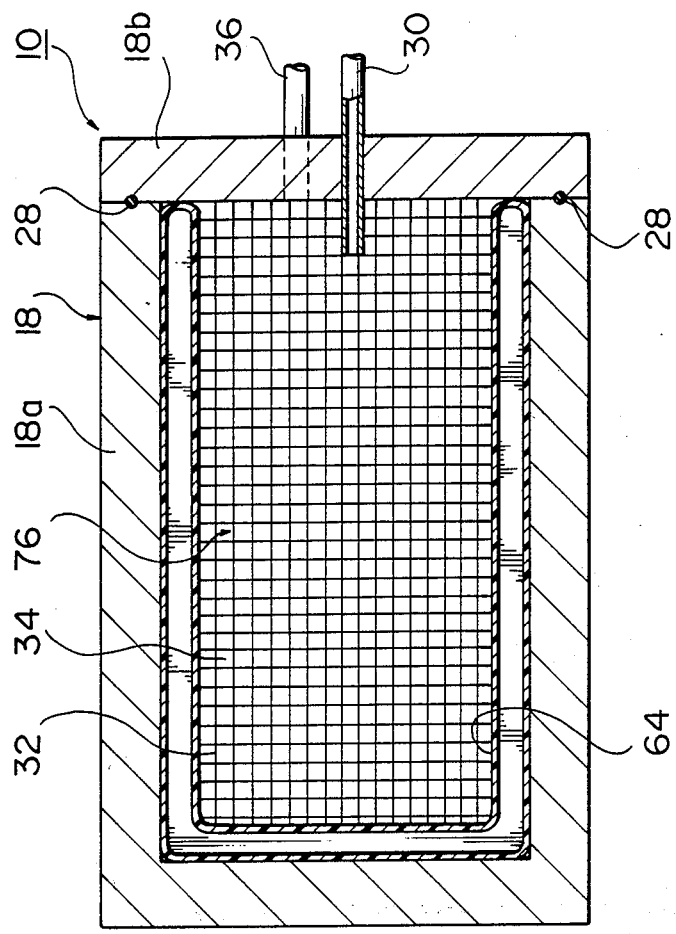
FIG. 4 is a sectional view taken along line IV—IV of FIG. 3.

FIGS. 3 and 4 show another embodiment of a jig for leak check according to the present invention.

A jig 10 of the embodiment shown in FIGS. 3 and 4 is constructed so as to carry out leak check of a hollow heat exchanger panel for a solar hot well which is a checked object designated at reference numeral 12. The hollow heat exchanger panel 12 is constituted by two corrugated sheet metals of a small thickness joined together by welding or the like, so that an inner space defining an uneven fluid passage 60 is formed in the panel 12. Also, the panel 12 is formed on an outer surface thereof with corrugation-like irregularities.

The so-formed heat exchanger panel 12 is provided at both ends thereof with a water inlet and a water outlet (not shown) respectively communicated with the fluid passage.

The jig 10 of the illustrated embodiment includes a jig body 18 rigidly formed of a metal material and constituted by at least two joinable members. In the illustrated embodiment, it comprises two members or a box-like main member 18a opened at one end thereof and a lid-like member 18b for covering the open end of the main member 18a, respectively.

The main member 18a and lid member 18b are joined together by means of fasteners 26 with a sealing member 28 being interposed therebetween, so that the jig body 18 may be assembled which has an inner space 20 defined therein.

The jig 10 also includes a closed chamber 22 provided at the jig body 18 for receiving the checked object or heat exchanger panel 12 therein for leak check. In the illustrated embodiment, the closed chamber is formed in the inner space 20 of the jig body 18.

More particularly, the jig 10 of the embodiment includes a sealed or hermetical air bag 62 received in the inner space 20 of the jig body 18. The air bag 62 may be formed of a flexible and stretchable material into a bag-like shape or a two-fold shape so that it may be intimately contacted on an outer surface thereof with an inner surface of the jig body 18 and formed at a central portion thereof with a depression 64 for receiving the checked body or heat exchanger panel 12 therein while being intimately contacted the outer surface of the panel 12. For this purpose, the air bag 62 may be made of, for example, a tough composite material comprising fabric of high tensile and rubber. In the embodiment, the depression 64 is opened toward the lid-like member 18b of the jig body 18. Thus, a surface 76 of the depression 64 cooperates with an inner surface of the lid-like member 18b to define the closed space 22. The air bag 62, as described above, is made of a deformable and stretchable material, resulting in the surface 76 of the depression 64 being intimately contacted with the outer surface of the panel 12 irrespective of its irregular outer configuration.

The jig 10 also includes pressurized gas supply means 30 provided through a wall of the jig body 18 or the lid-like member 18b so as to hermetically communicate with the checked object 12 for connecting the checked object 12 therethrough to a pressurized gas supply source such as an air compressor (not shown). In the illustrated embodiment, the pressurized gas supply means 30 includes a pressurized gas supply tube hermetically inserted through the wall of the jig body 18 or the lid-like member 18b so as to be airtightly or hermetically connected to an opening 66 of the heat exchanger panel 12. The opening 66 may be any one of the water inlet and outlet (not shown) of the panel 12 described above.

In the illustrated embodiment, the sealedly closed air bag 62 is expanded. This may be carried out by commonly communicating the air bag 62 with the same pressurized gas source. For this purpose, a ramificated gas supply tube 68 is hermetically inserted through the jig body 18 or the lid-like member 18b in a manner such that its one end is connected to an opening 70 of the air bag 62 to supply pressurized gas thereto and the other end is merged with the supply tube 30 through a three-way solenoid valve 72, which is then connected through a pipe 74 to the the pressurized gas source. The three-way solenoid valve 72 is adapted to selectively carry out supply of pressurized gas to the tubes 30 and 68 and interruption of the supply. Such construction permits pressurized gas to be concurrently supplied to both panel 12 and air bag 62 under the same pressure.

Further, the jig 10 of the illustrated embodiment includes leak lead-out means 32 provided on at least a part of an surface 23 of the closed chamber 22 for leading out leak from the checked object 12. In addition, the jig 10 includes leak transfer means 36 provided through the wall of the jig body 18 or the lid-like member 18b for causing the leak lead-out means 32 to communicate therethrough with an exterior of the jig body 18. In the illustrated embodiment, the leak transfer means 36 comprises a leak gas discharge passage member inserted through the lid-like member 18b so that its one end is opened to the closed chamber 22 and the other end is connected to a suitable leak detecting means (not shown). In the illustrated embodiment, the member 36 communicates with the leak lead-out means 32 through a space defined in the closed chamber 22, as shown in FIG. 3.

In the illustrated embodiment, the leak lead-out means 32 comprises a plurality of fine grooves 32 provided on a part of the surface 23 of the closed chamber 22 and more specifically on the surface 76 of the depression 64 of the air bag 62 defining a part of the closed chamber 22. The fine grooves 32 are formed in a mesh-like manner or in a manner to extend in directions perpendicular to each other, so that the surface 76 of the depression 64 may be divided into a number of mesh-like segments 34. The segments 36 each may be formed into a rectangular square shape. The grooves 32 serve as passages for guiding leak leak gas from the panel 12 to the leak transfer means 36, during which the segments 34 are kept substantially intimately contacted with the outer surface of the checked object 12 because the air bag has flexibility and stretchability.

Now, the manner of operation of the jig of the illustrated embodiment constructed as described above will be described hereinafter with reference to FIGS. 3 and 4.

First, the heat exchanger panel 12 is inserted into the depression 64 of the air bag 62 received in the box-like main member 18a of the jig body 18 and then the lid-like member 18b is put on the open end of the main member 18a to close its opening. Simultaneously, the pressure gas supply tube 30 is connected to the opening 66 of the panel 12. Also, the ramificated gas supply tube 68 is connected to the opening 70 of the air bag 62. Subsequently, the main member 18a and lid-like member 18b of the jig body 18 are joined together using the fasteners 26. Thereafter, the jig body 18 is connected through the leak gas discharge passage member 36 to a suitable leak detecting means such as a flowmeter, a pressure gauge, a bubble detecting device or the like.

After the heat exchanger panel 12 is thus arranged in the jig body 18 in a hermetical manner, the three-way solenoid valve 72 is operated to supply pressurized gas of, for example, about 10kg/cm$^2$ from the pressurized gas source (not shown) through the pipe 74, the supply tubes 30 and 68 and the openings 66 and 70 to the heat exchanger panel 12 and air bag 62 under substantially the same pressure, respectively. Then, when the air bag 62 is fully filled with the gas, the three-way solenoid valve 72 is changed over to stop supply of the gas to the air bag 62. Nevertheless, supply of pressurized gas to the heat exchanger panel 12 is continued. Accordingly, leak or leak gas from the heat exchanger panel 12 occurring when it has any defect causing leak such as poor weld, pin holes or the like is guided to at least any one of the fine grooves 32 provided on the surface of the depression 64 of the air bag 62 and then through the space of the closed chamber 22 to the leak gas discharge passage member 36.

In this instance, for example, a flowmeter or the like is used as the leak detecting means, leak gas from the heat exchanger panel 12 is led out through the grooves 32 and leak gas discharge passage 36 to the leak detecting means, resulting in leak from the tank 12 being detected by the leak gas itself. Whereas, when a pressure gauge or the like is used as the detecting means, a variation or increase in pressure in the closed chamber 22 which is caused due to leak of gas from the panel 12 is transmitted through the fine grooves 32 and leak gas discharge passage member 36 to the detecting means. Thus, the leak may be detected utilizing a variation in pressure in the closed chamber 22.

In the jig of the illustrated embodiment constructed as described above, the fine grooves 32 are formed on the surface 74 of the depression 64 which is a part of the surface 23 of the closed chamber 22 and the mesh-like segments 38 permit lead out of leak from the checked object 12 to the leak detecting means while keeping the checked body contacted with the surface 76 of the depression 64. More particularly, supply of pressurized gas to both heat exchanger panel 12 and air bag 62 under the same pressure causes pressure in the panel 12 to be balanced with that in the air bag 62, resulting in the segments 34 being kept intimately contacted with the surface of the heat exchanger panel 12. Accordingly, the illustrated embodiment effectively prevents expansion or deformation and damage of the checked object 12 made of a thin sheet material irrespective of supply of pressurized gas to the checked object and ensures accurate and rapid leak check. Also, it eliminates a necessity of immersing the checked object in liquid such as water, so that drying of the checked object after leak check may be eliminated, resulting in reduction of facilities, costs, time and labor required for leak check.

Also, the above-described construction of the embodiment shown in FIGS. 3 and 4 are applied to various hollow checked objects different in configuration, because the air bag 62 is flexible and stretchable and adapted to wrap a checked object therein. Accordingly, it eliminates a necessity of manufacturing a jig by molding or the like depending on a configuration of a checked object, to thereby accomplish further reduction of the costs and time.

In the above-described embodiment shown in FIGS. 3 and 4, the leak lead-out means 32 comprises the fine grooves formed in a mesh-like manner on the surface 76 of the depression 64 of the air bag 62 which is a part of the surface 23 of the closed chamber 22. However, the leak lead-out means 32 is not limited to such fine grooves. It may comprise an air-permeable lining applied on the surface 76 of the depression 64. For this purpose, a lining made of a porous material such as porous ceramics, porous castings, porous aluminum, a wire mesh or the like may be used.

Such a lining may function as the leak lead-out means 32 like the above-described fine grooves, as well as intimately contacts with the outer surface of the heat exchanger panel 12 to cause it to be held in the closed chamber 22 without any expansion and deformation.

Also, the embodiment may be so constructed that the lining 32 may be fixedly or detachably mounted on the inner surface 76 of the depression 64.

Also, the embodiment is not limited to leak check for a hollow heat exchanger panel. It may be applied to any checked object so long as it is hollow.

While preferred embodiments of the invention have been described with a certain degree of particularity with reference to the drawings, obvious modifications and variations are possible in light of the above teachings. It is therefore to be understood that the invention may be practiced otherwise than as specifically described.

What is claimed is:

1. A jig for leak check, comprising:
   a jig body constituted by at least two joinable members joined together so that an inner surface of said jig body defines an inner space in said jig body;
   a closed chamber provided in said jig body for receiving a hollow checked object therein and formed so as to have a surface of which at least a part is intimately contacted with an outer surface of said hollow checked body;
   pressurized gas supply means provided through a wall of said check body so as to hermetically communicate with said hollow checked object;
   leak lead-out means provided on at least a part of said surface of said closed chamber; and
   leak transfer means provided through said wall of said jig body so as to cause said leak lead-out means to communicate therethrough with an exterior of said jig body;
   wherein said closed chamber is formed in said inner space of said jig body;
   and further comprising an air bag made of a flexible and stretchable material and received in said inner space of said jig body;
   said air bag being formed with a depression which cooperates with a part of said inner surface of said jig body to form said closed space;
   said outer surface of said hollow checked object being intimately contacted with a surface of said depression;
   wherein said joinable members comprise a box-like main member and a lid-like member; and
   wherein said depression is opened towards said lid-like member and said part of said inner surface of said jig body is an inner surface of said lid-like member.

2. A jig as defined in claim 1, wherein said leak lead-out means comprises a plurality of fine grooves formed in a mesh-like pattern on said surface of said depression of said air bag;
   said leak transfer means communicating through said closed space to said grooves.

3. A jig as defined in claim 2, wherein said surface of said depression is divided into a number of segments by said fine grooves;
   said segments of said inner surface being intimately contacted with said outer surface of said hollow checked object.

4. A jig as defined in claim 1, wherein said leak lead-out means comprises a lining made of an airpermeable material and applied on said inner surface of said jig body.

5. A jig as defined in claim 4, wherein said lining is detachably mounted on said surface of said depression.

* * * * *